US008864066B2

(12) United States Patent
Marche

(10) Patent No.: US 8,864,066 B2
(45) Date of Patent: Oct. 21, 2014

(54) RIGID AIRCRAFT PYLON FITTED WITH A RIB EXTENSION FOR TAKING UP THE MOMENT IN THE LENGTHWAYS DIRECTION

(75) Inventor: Jacques Hervé Marche, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 644 days.

(21) Appl. No.: 13/131,999

(22) PCT Filed: Nov. 30, 2009

(86) PCT No.: PCT/FR2009/052331
§ 371 (c)(1),
(2), (4) Date: Sep. 2, 2011

(87) PCT Pub. No.: WO2010/063925
PCT Pub. Date: Jun. 10, 2010

(65) Prior Publication Data
US 2011/0309189 A1 Dec. 22, 2011

(30) Foreign Application Priority Data
Dec. 1, 2008 (FR) ...................... 08 58169

(51) Int. Cl.
*B64D 27/14* (2006.01)
*B64D 27/20* (2006.01)
*B64D 27/26* (2006.01)

(52) U.S. Cl.
CPC ................ *B64D 27/14* (2013.01); *B64D 27/26* (2013.01); *B64D 2027/266* (2013.01)

USPC ........................................................ 244/54

(58) Field of Classification Search
USPC ................ 244/54, 55; 60/796–797; 248/200, 248/205.1, 207, 214, 554–557
See application file for complete search history.

(56) References Cited

U.S. PATENT DOCUMENTS

| 4,821,980 A | 4/1989 | Clausen et al. |
| 4,854,525 A * | 8/1989 | Chee ............................... 244/54 |
| 5,064,144 A | 11/1991 | Chee |
| 5,065,959 A * | 11/1991 | Bhatia et al. ..................... 244/54 |
| 7,726,602 B2 * | 6/2010 | Llamas Sandin ............... 244/54 |

FOREIGN PATENT DOCUMENTS

EP 0 311 155 4/1989

OTHER PUBLICATIONS

International Search Report issued Feb. 8, 2010 in PCT/FR09/052331 filed Nov. 30, 2009.
U.S. Appl. No. 13/131,939, filed May 31, 2011, Marche.

* cited by examiner

*Primary Examiner* — Joseph W Sanderson
*Assistant Examiner* — Marc Burgess
(74) *Attorney, Agent, or Firm* — Oblon, Spivak, McClelland, Maier & Neustadt, L.L.P.

(57) ABSTRACT

An engine assembly for an aircraft, including a rigid structure including a box rib extension protruding from a box of the structure, in a line of separation, towards a fuselage of the aircraft. The extension supports a first attachment in a position separating it from a second attachment in the line of separation. The first and second attachments enable the moment being exerted in a lengthways direction of the turbine engine to be transmitted jointly.

13 Claims, 7 Drawing Sheets

RIGID AIRCRAFT PYLON FITTED WITH A RIB EXTENSION FOR TAKING UP THE MOMENT IN THE LENGTHWAYS DIRECTION

BACKGROUND OF THE INVENTION

I. Field of the Invention

The present invention relates in a general sense to an aircraft engine assembly, particularly of the type intended to be mounted laterally on a rear part of the aircraft.

II. Description of Related Art

When such a position is chosen one of the difficulties in designing the mounting pylon lies in transmitting the moment exerted in the lengthways direction where the engine assembly is attached to the aircraft's fuselage. This moment results, indeed, from a high load applied vertically to the centre of gravity of the engine assembly, which is positioned laterally offset from the fuselage on to which this unit is attached.

Generally, the fasteners interposed between the rigid structure of the mounting pylon and the structure of the aircraft are designed such that this bending moment is transmitted with two separate attachments, each transmitting radial loads, and spaced relative to one another in the tangential direction of the fuselage, also comparable to the direction of the thickness of the mounting pylon. However, given the extremely high intensity of this bending moment which is exerted in the lengthways direction, it is necessary to over-dimension the attachments concerned, and/or to position them with a large distance between them. Whatever approach is adopted, it necessarily results in a high degree of encumbrance of the pylon, in the direction of its thickness, which generates non-negligible aerodynamic disturbance, affecting the overall efficiency of aircraft fitted with this type of engine assembly. Moreover, this efficiency is also penalised by the surplus mass arising from the over-dimensioning of the rigid structure of the pylon and/or of the attachments connecting the latter to the structure of the aircraft.

BRIEF SUMMARY OF THE INVENTION

The purpose of the invention is therefore to propose an aircraft engine assembly at least partially providing a solution to the disadvantage mentioned above, compared with the embodiments of the prior art.

To accomplish this, the purpose of the invention is an aircraft engine assembly including a turbine engine and a pylon for mounting the turbine engine, where the said engine assembly is intended to be added on laterally to the structure of the aircraft, where the said pylon includes a rigid structure produced from at least one box and offset radially relative to a lengthways axis of the turbine engine in a line of separation, where the pylon also includes first fasteners mounting the turbine engine on the rigid structure, and second fasteners attached firstly to the said rigid structure and intended to be attached, moreover, to the structure of the aircraft, and where the said second fasteners are fitted with a first attachment and a second attachment allowing the moment exerted in a lengthways direction of the turbine engine to be transmitted jointly.

According to the invention, the said rigid structure also includes a box rib extension protruding from the said at least one box, in a first direction of the line of separation extending from the turbine engine to the rigid structure, where the said rib extension supports the said first attachment in a position separating it from the said second attachment, in the line of separation.

Thus, the invention provides an original solution enabling the bending moment associated with the engine assembly, exerted in the lengthways direction, to be transmitted, when this unit is mounted laterally on the structure of the aircraft, i.e. preferably on its fuselage and/or on a lateral extension of this fuselage. Indeed, the first and second attachments are presently designed to transmit the moment exerted in the lengthways direction, and are separated from one another in the line of separation between the rigid structure and the turbine engine, where this direction is also the line of separation between the fuselage of the aircraft and this same turbine engine. In this direction, it is easily possible to separate both attachments by a substantial distance without causing a notable over-dimensioning for the rigid structure, given that the minimum length of this rigid structure required in order to provide the lateral offset of the turbine engine relative to the fuselage may be sufficient. Thus, it is no longer necessary, either, to over-dimension the attachments themselves, due to the large possible separation between them. The mounting pylon may accordingly still have a reasonable overall mass.

Above all, no over-dimensioning is practised in the direction of the thickness, providing the possibility of having a tighter shape for the mounting pylon unit, generating less aerodynamic disturbance. The overall efficiency of the aircraft fitted with engine assemblies according to the invention is advantageously improved.

A ratio between the length of the said rib extension in the line of separation, and the length in this same direction of the rigid structure in the area of the said rib extension is preferably between 0.3 and 0.7.

Each of the said first and second attachments of the second fasteners preferably includes a cylindrical part for transmitting the loads which is aligned with the lengthways direction of the turbine engine. This thus enables loads to be transmitted in a direction having at least one vertical component when the engine assembly is added on laterally to the aircraft. With this regard, it is noted that the first and second attachments may be roughly aligned in the line of separation, or alternatively offset relative to one another, for example in the lengthways direction.

The rib of the box extended by the said rib extension, and this same rib extension, are preferably made from a single part, favouring an improved transmission of the bending moment in the lengthways direction, given that the loads allowing the transmission of this moment are directly introduced within the said box.

The rigid structure preferably includes a lengthways central box supporting at least some of the said first fasteners, together with a connecting box supported by the said lengthways central box and protruding from the latter in the said first direction of the line of separation, where the said connecting box is shorter than that of the lengthways central box in the said lengthways direction of the turbine engine, and supporting at least some of the said second fasteners.

With this regard, it preferable that the said second attachment is supported by the said connecting box, although the latter attachment could alternatively be supported by the rib extension or the rib itself, without going beyond the scope of the invention.

The said rib extension is preferably made from a single part with a lengthways central box and connecting box closure rib, where this rib may be the forward closure rib or the rear closure rib.

In addition, the invention relates to a rear part of an aircraft including at least one engine assembly as described above, added on laterally to the fuselage of the aircraft, and/or to a lateral extension of this fuselage. When such a lateral fuselage extension is designed it preferably extends laterally towards the outside relative to the fuselage, although it could alternatively extend laterally towards the inside, then possibly implying that it traverses the fuselage with the rib extension supporting the said first attachment.

In a known manner, the engine assembly positioned laterally relative to the fuselage behind the principal wing surface is not necessarily positioned such that the said line of separation is parallel to or merged with a median horizontal plane of the aircraft, since there can indeed be an angle between this median horizontal plane of the aircraft and the said line of separation.

Another purpose of the invention relates to a rear part of an aircraft including at least one engine assembly as described above, added on laterally to the fuselage of the aircraft, and/or to a lateral extension of this fuselage.

Finally, a purpose of the invention is an aircraft including a rear part as presented above.

Other advantages and characteristics of the invention will appear in the non-restrictive detailed disclosure below.

BRIEF DESCRIPTION OF THE SEVERAL VIEWS OF THE DRAWINGS

This description will be made with reference to the attached illustrations, among which

DETAILED DESCRIPTION OF THE INVENTION

Figure 1:
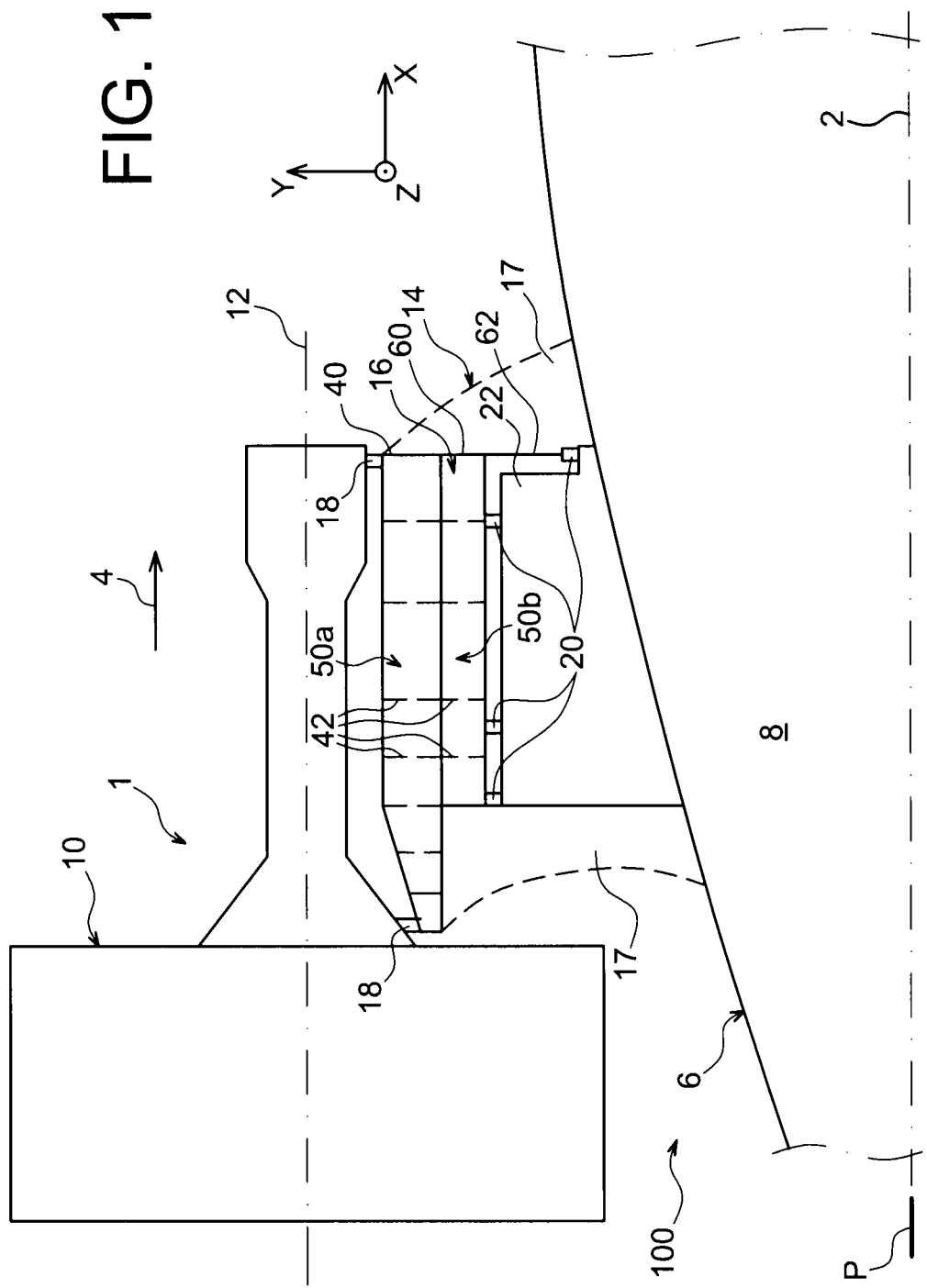
FIG. 1 represents a schematic top view of a rear part of an aircraft, including an engine mounting pylon according to a preferred embodiment of the present invention.

With reference to FIG. 1, a rear part 100 of an aircraft can be seen including an engine assembly having the form of a preferred embodiment of the present invention.

In the whole of the following description, by convention, the lengthways direction of the aircraft which is parallel to a lengthways axis of this aircraft is called X. In addition, the direction aligned transversely relative to the aircraft is called Y, and the vertical direction or direction of the height is called Z, and these three directions X, Y and Z are mutually orthogonal.

In addition, the terms "front" and "rear" must be considered relative to the forward direction of the aircraft imparted due to the thrust exerted by the engines, and this direction is represented schematically by the arrow 4.

Overall, the rear part 100 includes a fuselage 6, of which only a portion of the left-hand part has been represented. The transverse section of this fuselage is roughly circular, elliptical or similar, having a centre passing through the lengthways axis 2, and demarcating an internal space of the aircraft 8.

In addition, it includes two engine assemblies 1 (only one is represented) positioned either side of a vertical median plane P passing through the axis 2. In the preferred embodiment each assembly 1 includes a turbine engine 10, which may equally be of the turbojet or turboprop engine type, or of another type. Each has a lengthways axis 12 which is roughly parallel to direction X. In addition, engine assembly 1 is positioned laterally relative to the fuselage 6, with the stipulation with this regard that there may be an angle between the median horizontal plane of the aircraft and the plane passing through the lengthways axes 2, 12 of the turbine engine and of the aircraft, as will be described in due course with reference to FIG. 2. Typically, this angle may be between 10 and 35°. Be that as it may, engine assembly 1 is considered as being added on laterally to the aircraft, and more specifically to a rear part of it, on the fuselage 6 or a lateral extension 22 of it, behind the principal wing surface.

To provide the suspension of the turbine engine 10 there is a mounting pylon 14, including a rigid structure 16 also called the primary structure, through which the loads are transmitted, where the rigid structure 16 is traditionally encased with aerodynamic fairings 17, also called secondary structures, as represented schematically by dotted lines in FIG. 1.

The pylon 14 has first fasteners interposed between the turbine engine 10 and the rigid structure 16, where these first fasteners represented schematically are referenced 18 in FIG. 1. In addition, the pylon 14 has second fasteners interposed between the rigid structure 16 and the structure of the aircraft, where these second fasteners represented schematically are referenced 20 in FIG. 1. In the represented preferred embodiment, the second fasteners 20 are connected to the outside lateral fuselage extension 22, preferably having the shape of a box, but could, of course, be connected alternatively or simultaneously to the fuselage itself.

Figure 2:
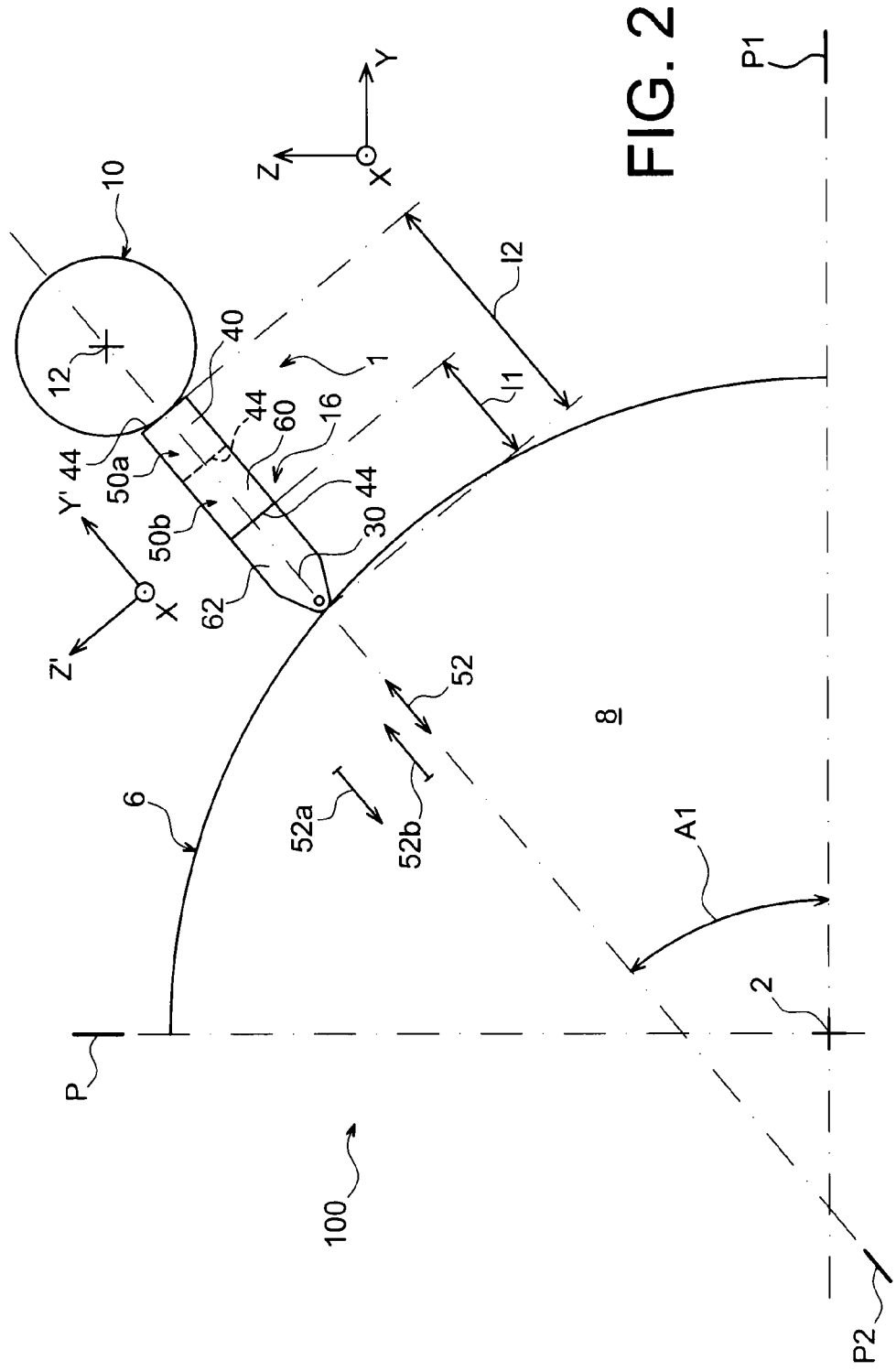
FIG. 2 represents a partial schematic transverse section view of a rear part of an aircraft shown in FIG. 1.

In FIG. 2 it can be seen that the rigid structure 16 includes at least one box 50a, 50b offset radially relative to axis 12 of the engine, in a line of separation referenced 52, which is also the line of separation between the fuselage of the aircraft and this same turbine engine 10, and also the direction of the width of the said box 50a, 50b.

As an indication, the line of separation 52 is not necessarily parallel or merged with a median horizontal plane P1 of the aircraft, and there can indeed be an angle A1 between this median horizontal plane P1 and the line of separation 52, as is shown in FIG. 2. In a transverse section such as that shown in this figure, the inclined plane P2, including the line of separation 52 and forming the angle A1, may be separate from the abovementioned plane passing through the lengthways axes 2, 12 of the turbine engine and of the aircraft, where the value of the angle A1 nonetheless preferably remains between 10 and 35°, and even more preferentially around 24°.

With this regard, a new marker, attached to engine assembly 1 and defined by the directions X, Y' and Z', will be used for the remainder of the description. Direction X is still the lengthways direction of the aircraft and of the turbine engine, whereas direction Y', aligned in a YZ plane, is the line of separation 52. Finally, direction Z', which is also aligned in a YZ plane, is orthogonal to both the X and Y' directions, and therefore orthogonal to the abovementioned plane P2.

Figure 3:
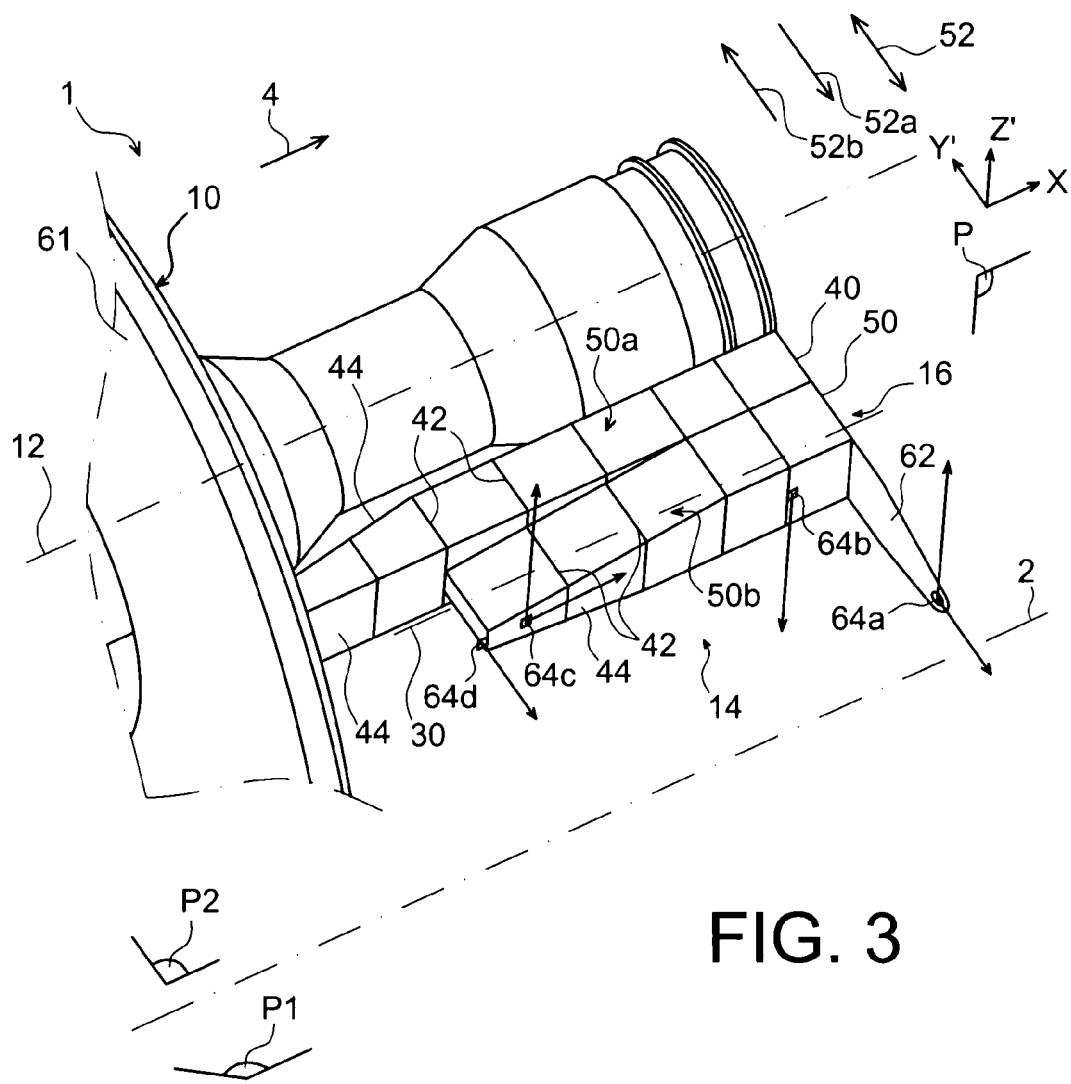
FIG. 3 represents a partial perspective view of the engine assembly of the rear part of an aircraft shown in FIGS. 1 and 2.

In FIG. 3 the rigid structure 16 can be seen, including therefore a lengthways central box 50a extending in a principal direction 30 from the pylon, comparable to its lengthways direction and parallel to direction X. The box 50a may have a forward closure rib 40 and a rear closure rib (not referenced in FIG. 3), and possibly also lateral closure ribs 44 and internal reinforcing ribs 42. An upper skin and a lower skin are also included (not referenced), roughly in XY' planes. The box 50a is intended to support the first fasteners, and preferably all of them, connecting the rigid structure of the pylon to the turbine engine.

In addition, the rigid structure 16 includes a connecting box 50b supported by the lengthways central box 50a and protruding from the latter in a first direction 52a of the line of separation 52, from the turbine engine to the rigid structure 16. Of course, this first direction 52a is opposed to the opposite direction 52b of this line 52. Here too, the box 50b extends in the principal direction 30 of the pylon, comparable to its lengthways direction, and may have a forward closure rib 60 and a rear closure rib (not referenced in FIG. 3), and possibly also lateral closure ribs 44 and internal reinforcing ribs 42. As such, the same lateral rib 44 can simultaneously close both boxes 50a, 50b. There is also an upper skin and a lower skin (not referenced), roughly in XY' planes, preferably the same planes as those of the box 50a, given that they preferentially have a thickness roughly in direction Z'. The thickness of the connecting box 50b can nonetheless be reduced towards the rear, as is visible in FIG. 3.

Conversely, the connecting box 50b has a length, in direction X, which is less than the length of the central box 50a, since the latter is, indeed, closer to the receiver 61 of the turbine engine. Both front closure ribs 40 and 60 are preferably made from a single part positioned in a Y'Z' plane, and only the rear closure ribs of the boxes 50a, 50b are thus spaced relative to one another in direction 30.

Each box 50a, 50b, and more generally the entire rigid structure 16, has the abovementioned imaginary plane P2 forming roughly its plane of symmetry.

One of the characteristics of the present invention lies in the fact that the rigid structure 16 also includes a box rib extension 62 protruding from the connecting box 50b in the first direction 52a of the line of separation, namely in the direction of the fuselage 6. This extension 62, which is preferably made from a single part with the front closure ribs 40, 60 which it extends in the direction of the fuselage in the Y'Z' plane concerned, supports a first attachment 64a belonging to the second fasteners 20, preferably on or near one end of the extension positioned facing the fuselage. It should be noted that the single-piece part may be perforated to reduce its mass.

A ratio between the length 11 of the rib extension 62 in the line of separation 52, and the length 12 in this same direction of the rigid structure 16 in the area of this extension is preferably between 0.3 and 0.7.

In the preferred embodiment, the length 12 corresponds to the length of the single-piece part including the closure ribs 40, 60 and also the extension 62, as shown in FIG. 2.

The first attachment 64a, which is represented schematically only in FIG. 3, is then positioned in such a way that it is separated from a second attachment 64b in the first direction 52a of the line of separation, where this second attachment 64b of the second fasteners is, preferably, positioned on the lateral closure rib 44 of the box 50b which is facing the fuselage. The first and second attachments 64a, 64b, which are separated in direction 52, generally jointly enable the moment exerted in direction X, to which the engine assembly 1, which is overhanging laterally relative to the fuselage, is likely to be subject, to be transmitted.

Figure 4:
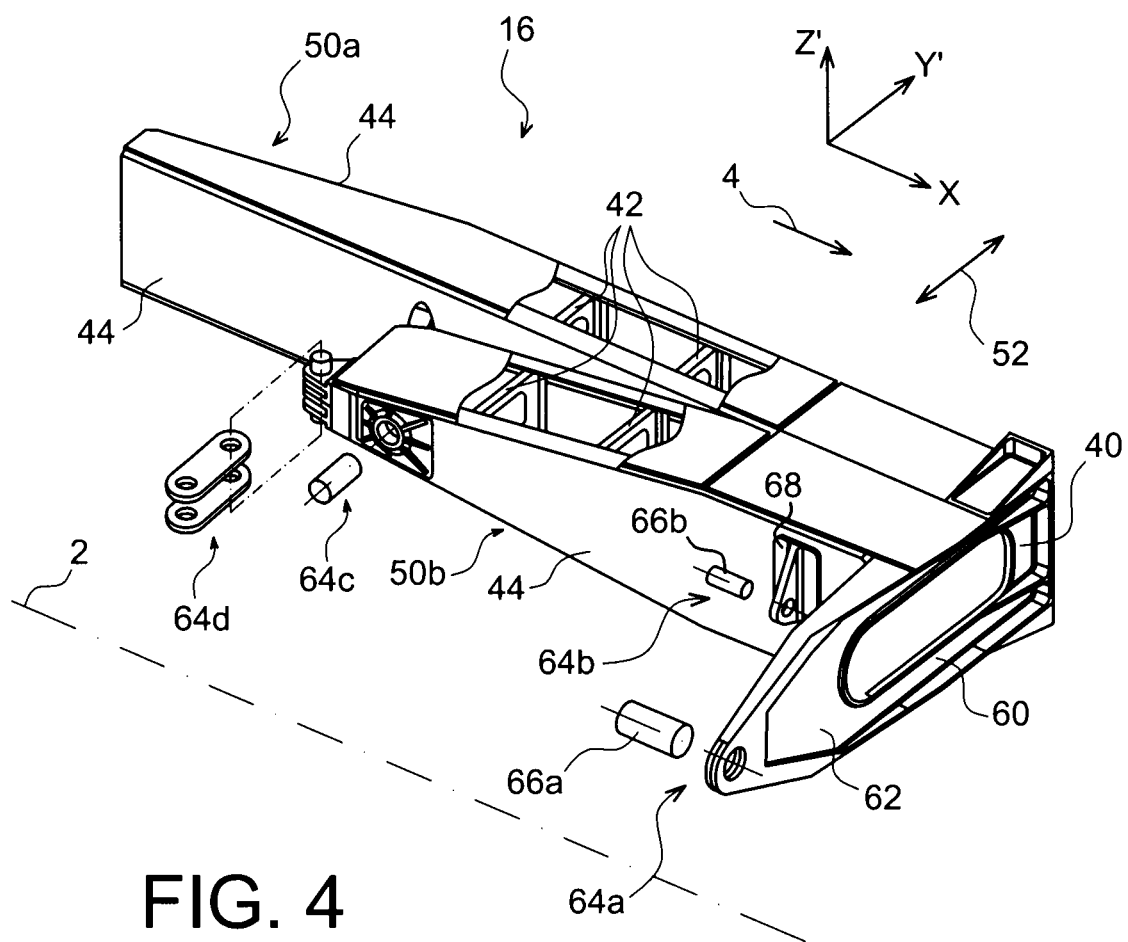
FIG. 4 represents a more detailed perspective view of the rigid structure of the engine assembly shown in FIGS. 1 to 3, fitted with second fasteners represented only partially.

With reference, now, jointly to FIGS. 3 and 4, the first attachment 64a is designed to incorporate a cylindrical part to transmit the loads 66a which is aligned in the direction X and traversing one or more orifices having the same axis made in the rib extension 62, together with one or more orifices having the same axis (not represented) made in the fuselage extension or in a bracket added on to it. Thus, this first attachment 64a is intended to transmit the loads being exerted only in directions Z' and Y'.

The second attachment 64b is also designed to incorporate a cylindrical part for transmitting the loads 66b which is aligned in direction X and traversing one or more orifices of the same axis made in a bracket 68 added on to the lateral rib 44, together with one or more orifices of the same axis (not represented) made in the fuselage extension or in a bracket added on to this extension. Thus, the second attachment 64b, which is slightly offset from the first attachment 64a in direction X, towards the rear, is intended to transmit loads exerted only in direction Z'.

Furthermore, the second fasteners preferably include a third attachment 64c positioned to the rear of the second attachment 64b, also on the lateral closure rib, where this attachment, of the "spigot" type, is intended to transmit loads exerted only in directions Z' and X. Finally, a fourth attachment 64d completes the second attachments, and this attachment is positioned, for example, on a rear closure rib of the connecting box 50b, and is intended to transmit loads exerted only in direction Y'.

Thus, these four attachments advantageously constitute a system for isostatic attachment of the engine assembly 1 on to the structure of the aircraft.

Figure 5:
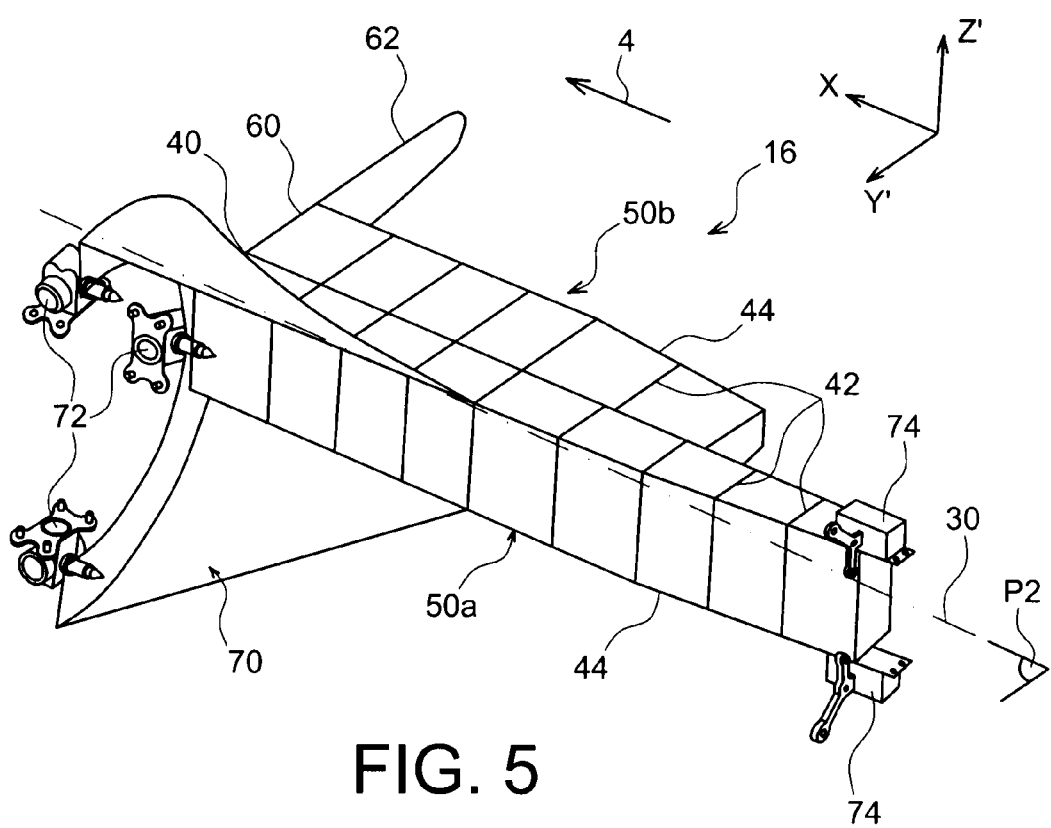
FIG. 5 represents a perspective view of the rigid structure of the engine assembly according to an alternative embodiment, fitted with the first fasteners.

In FIG. 5, the rigid structure 16 takes the form of an alternative embodiment, since it is completed by a structure called an enveloping structure 70 extending from either side of the central box 50a, from the lower and upper skins. The enveloping structure 70, which therefore has plane P2 as its plane of symmetry, extends in such a way as to be able to support front engine attachments 72, two of which are intended to be positioned in a diametrically opposite manner with regard to the turbine engine which they hold in place, either side of plane P2. The third front attachment, called a "soft mount" like the other two, is, for its part, designed such that it is traversed by plane P2.

As can be seen in FIG. 5, the first attachments also include a rear engine attachment 74, for example divided into two half-attachments positioned on a rear end of the central box 50a, in a known manner for the skilled man in the art.

Figure 6A:
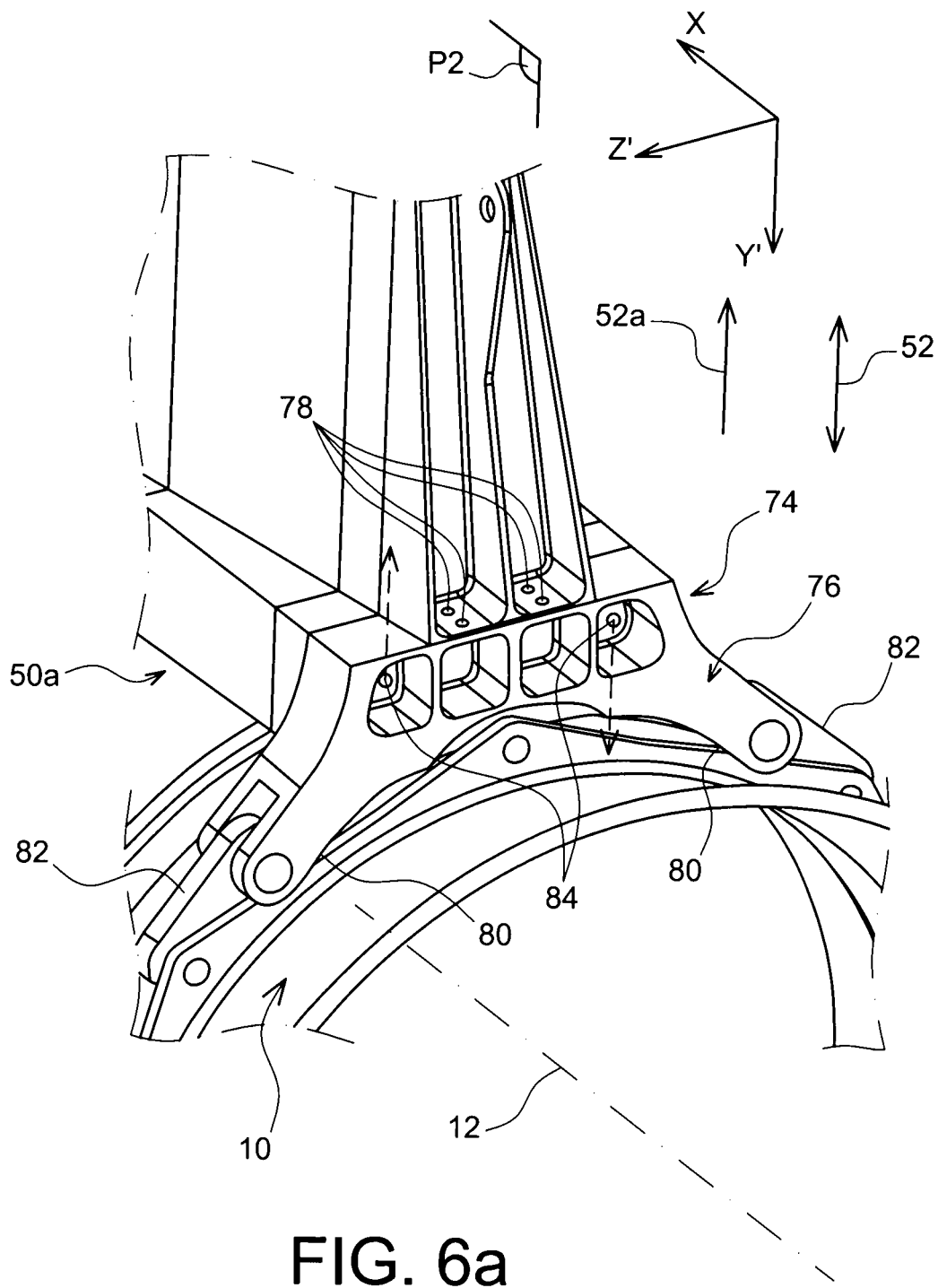
FIGS. 6a and 6b show respectively two possible alternatives for the embodiment of a rear engine attachment of the first fasteners.

FIG. 6a nonetheless represents a conceivable original design for the rear engine attachment 74, using a connecting bracket 76 between the rear end of the central box 50a, and the housing of the turbine engine 10. This bracket 76, which has plane P2 as its plane of symmetry, abuts in direction 52a of the line of separation 52 against a stop area made in an indentation of the rear end of box 50a, where the bolts 78 aligned in direction Y' join the two elements such that they cannot move relative to one another. In addition, bracket 76 has two opposing caps 80 spaced out in direction Z', to which are connected small connecting rods or shackles 82, which are also connected to the housing of the turbine engine, also preferably using caps installed on this same housing.

In addition, bracket 76 is connected to the other indentation surface made in the rear end of box 50a, by two load transmission pins 84 positioned in direction X, and separated from one another in direction Z'. They thus jointly allow the moment exerted in direction X associated with the engine 10 to be transmitted relative to the rigid structure of the mounting pylon. The bolts 78 are preferably positioned between the two slugs 84, thus providing a large relative separation of the slugs, for improved transmission of the moment.

Figure 6B:
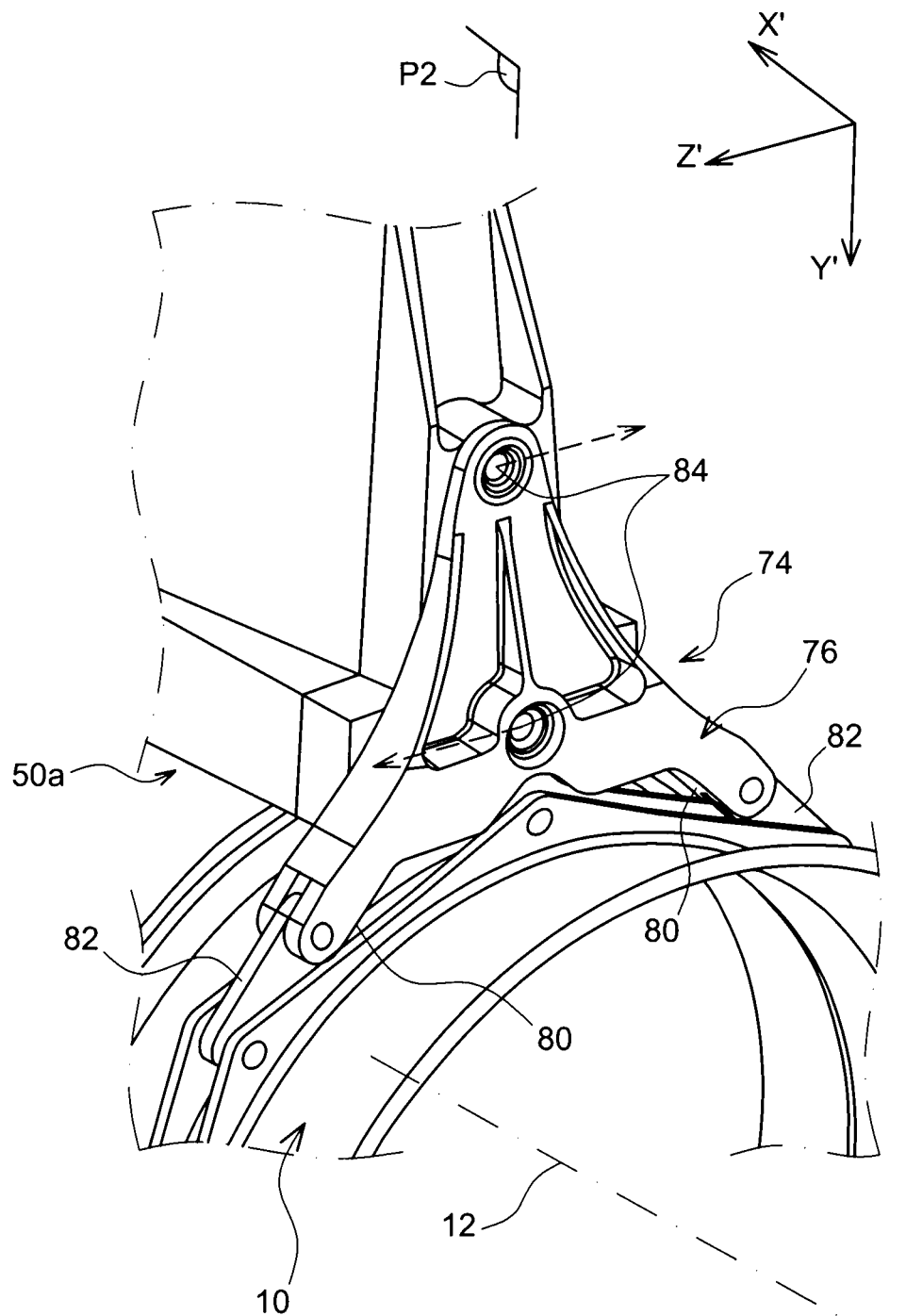

According to another possible alternative represented in FIG. 6b, the bracket 76 is roughly triangular, with the two load transmission pins 84 positioned in direction X, but in this case separated from one another in plane P2 in direction Y', and no longer in direction Z'.

Naturally, various modifications can be made by the skilled man in the art to the invention which has just been described, solely as non-restrictive examples.

The invention claimed is:

1. An aircraft engine assembly comprising:
a turbine engine and a pylon to mount the turbine engine,
wherein the engine assembly is configured to be added on laterally to a structure of the aircraft,
wherein the pylon includes a rigid structure including at least one box and offset radially relative to a lengthways axis of the turbine engine in a line of separation,
wherein the pylon further includes first fasteners mounting the turbine engine on the rigid structure, and second fasteners attached firstly to the rigid structure and configured to be attached to the structure of the aircraft,
wherein the second fasteners include a first attachment and a second attachment allowing a moment exerted in a lengthways direction of the turbine engine to be transmitted jointly,
wherein each of the first and second attachments of the second fasteners includes a cylindrical part to transmit loads, and the cylindrical part is aligned in the lengthways direction of the turbine engine and traverses one or more orifices having an axis in the lengthways direction of the turbine engine, so that the first and second attachments are directly attached to the rigid structure and to the structure of the aircraft and do not transmit loads in the lengthways direction of the turbine engine between the rigid structure and the structure of the aircraft,
wherein the rigid structure further includes a box rib extension protruding from the at least one box, in a first direction of the line of separation extending from the turbine engine to the rigid structure, and
wherein the rib extension supports the first attachment in a position separating the first attachment from the second attachment, in the line of separation.

2. An engine assembly according to claim 1, wherein a ratio between a length of the rib extension in the line of separation and a length in the same direction of the rigid structure in an area of the rib extension is between 0.3 and 0.7.

3. An engine assembly according to claim 1, wherein the box rib extended by the rib extension, and said rib extension, are made from a single part.

4. An engine assembly according to claim 1,
wherein the at least one box includes a lengthways central box and a connecting box, the rigid structure includes the lengthways central box supporting at least some of the first fasteners, together with the connecting box supported by the lengthways central box and protruding from the central box in the first direction of the line of separation,
wherein the connecting box is shorter than that of the lengthways central box in the lengthways direction of the turbine engine, and supporting at least some of the second fasteners.

5. An engine assembly according to claim 4, wherein the second attachment is supported by the connecting box.

6. An engine assembly according to claim 4, wherein the rib extension is made from a single part with a closure rib of the lengthways central box and of the connecting box.

7. An engine assembly according to claim 1, wherein the second fasteners include a third attachment and a fourth attachment, and the first, second, third, and fourth attachments are all separated from one another in the lengthways direction of the turbine engine.

8. An engine assembly according to claim 7, wherein one of the third and fourth attachments transmits loads in the lengthways direction of the turbine engine.

9. An engine assembly according to claim 7, wherein the first, second, third, and fourth attachments isostatically attach the engine assembly to the structure of the aircraft.

10. An engine assembly according to claim 1, wherein the first fasteners include a bracket connected to a surface of a rear end of the at least one box by load transmission pins aligned in the lengthways direction of the turbine engine, and the load transmission pins jointly allow the moment exerted in a lengthways direction of the turbine engine to be transmitted relative to the rigid structure of the pylon.

11. An engine assembly according to claim 1, wherein the second fasteners include a third attachment and a fourth attachment that each include a cylindrical part, and one of the third and fourth attachments transmits loads only in the first direction of the line of separation.

12. A rear part of an aircraft including at least one engine assembly according to claim 1, added on laterally to at least one of a fuselage of the aircraft and a lateral extension of the fuselage.

13. An aircraft including the rear part according to claim 12.

* * * * *